(12) United States Patent
Pan et al.

(10) Patent No.: US 7,203,622 B2
(45) Date of Patent: Apr. 10, 2007

(54) VALUE-BASED TRANSMISSION ASSET MAINTENANCE MANAGEMENT OF ELECTRIC POWER NETWORKS

(75) Inventors: Jiuping Pan, Raleigh, NC (US); Reynaldo Nuqui, Cary, NC (US); Le Tang, Cary, NC (US)

(73) Assignee: ABB Research Ltd., Zurich (CH)

( * ) Notice: Subject to any disclaimer, the term of this patent is extended or adjusted under 35 U.S.C. 154(b) by 449 days.

(21) Appl. No.: 10/744,743

(22) Filed: Dec. 23, 2003

(65) Prior Publication Data

US 2004/0158772 A1 Aug. 12, 2004

Related U.S. Application Data

(60) Provisional application No. 60/436,248, filed on Dec. 23, 2002.

(51) Int. Cl.
*G06F 11/30* (2006.01)
*G06F 15/00* (2006.01)

(52) U.S. Cl. ..................................... 702/184
(58) Field of Classification Search ................ 702/184, 702/57, 60, 61, 62; 713/340, 300, 310, 320; 700/286, 297, 291, 287, 290, 292, 298; 714/47, 714/48; 340/870.06, 3.1, 500
See application file for complete search history.

(56) References Cited

U.S. PATENT DOCUMENTS

| 5,107,497 | A |   | 4/1992 | Lirov et al. |
| 5,331,579 | A | * | 7/1994 | Maguire et al. ............... 703/2 |
| 5,699,403 | A | * | 12/1997 | Ronnen ................... 379/15.04 |
| 5,798,939 | A |   | 8/1998 | Ochoa et al. |
| 6,041,287 | A |   | 3/2000 | Dister et al. |
| 6,167,352 | A |   | 12/2000 | Kanevsky et al. |
| 6,321,187 | B1 |  | 11/2001 | Squier et al. |
| 6,330,935 | B1 |  | 12/2001 | Systermans |
| 6,671,634 | B2 |  | 12/2003 | Koutlev et al. |

OTHER PUBLICATIONS

Kuntz, P.A., "Optimal reliability centered vegetation maintenance scheduling in electric power distribution system", *Ph.D. Thesis of UOW*, 1999.
Radmer, D.T., "Predicting Vegetation–Related Failure Rates in Electric Power Distribution System", *Master Thesis of UOW*, 1999, 1–51.
Chow, M. et al., "Analysis and Prevention of Animal-Caused Faults in Power Distribution System", *IEEE Transactions On Power Delivery*, 1995, 10(2), 995–1001.
Frazier, S.D., "Suggested Practices for Reducing Animal-Caused Outages", *IEEE Industry Application Magazine*, Jul./Aug. 1996, 25–31.
*IEEE Guide for Improving the Lightning Performance of Electric Power Overhead Distribution Lines*, 1410–1997, Approved Jun. 26, 1997, 1–39.
Tolbert, L.M., et al., "Reliability of Lightning Resistant Overhead Distribution Lines", *IEEE I & CPS*, May 1999, 147–152.
Short, T.A., "Lightning Protection of Overhead Distribution Lines", http://www.pti–us.com/pti/consult/lightning protection of overhead.htm, Sep. 14, 2001, 9 page.

(Continued)

*Primary Examiner*—John Barlow
*Assistant Examiner*—Demetrius Pretlow
(74) *Attorney, Agent, or Firm*—Woodcock Washburn LLP

(57) ABSTRACT

A systematic approach is presented for the development and implementation of cost-effective transmission asset maintenance strategies. The overall concept and methodology are based on transmission reliability and risk management and address the value of preventive maintenance activities. This may help electric network utilities conduct maintenance policy assessment, region-wide criticality analysis, and optimal maintenance resource allocation and task scheduling.

31 Claims, 13 Drawing Sheets

OTHER PUBLICATIONS

Short, T.A., "Monitoring Results of the Effectiveness of Surge Arrester Spacings on Distribution Line Protection", http://www.pti–us.com/pti/consult/lico.htm, Sep. 14, 2001, 12 pages.

"Electric Power Industry Applications of Lightning Data", *Global Atmospherics Lightning Detection,* http://www.glatmos.com/industries/article1.html, Sep. 17, 2001, 7 pages.

McDermott, T.E. et al., "Lightning Protection of Distribution Lines", *IEEE Transactions on Power Delivery,* Jan. 1994, 9(1), 138–152.

"Working Group Report: Calculating the Lightning Performance of Distribution Lines", *IEEE Transactions on Power Delivery,* 1990, 5(3), 1408–1417.

*IEEE Recommended Practice for the Design of Reliable Industrial and Commercial Power Systems* (Gold Book), IEEE Std 493–1997, Approved Dec. 16, 1997, 1–492.

Horton, W.F., et al., "The failure rates of overhead distribution system components", *IEEE,* 1991, 713–717.

Horton, W.F., et al., "Determination of Failure Rates of Underground Distribution System Components from Historical Data", *IEEE,* 1991, 718–723.

Stember, L.H., et al., "Analysis of Field Failure Data on HMWPE and XLPE Insulated High–Voltage Distribution Cable", *IEEE Trans on Power Apparatus,* 1985, vol. PAS–104(8), 1979–1985.

Cizelj, R.J., et al., "Components Reliability Assessment Using Quantitative and Qualitative Data", *Relaibility Engineering and System Safety,* 2001, 71, 81–95.

Gupta, S., et al., "Predicting the Failure Rates of Overhead Distribution Lines Using an Adaptive–Fuzzy Technique", 2001, 1–5.

"IEEE Guide for Failure Investigation, Documentation and Analysis for Power Transformers and Shunt Reactors", *IEEE Standards Board,* 1992, C57, 125–1991.

Frimpong, G.K., "Facilities Assessment Management Engineering(An Overview)", *ABB Internal Report,* Jun. 9, 2000, 19 pages.

Canadian Electricity Association 2000 Annual Service Continuity Report on Distribution System Performance in Electrical Utilities, May 2001, 1–78.

Canadian Electricity Association, Forced Outage Performance of Transmission Equipment– for the period Jan. 1, 1994 to Dec. 31, 1998, Feb. 2000, 1–142.

Wang, Z., "Artificial Intelligence Applications in the Diagnosis of Power Transformer Incipient Faults", *Virginia Tech, Ph.D., dissertation,* Aug. 2000, 1–105.

Densley, J., "Ageing Mechanisms and Diagnostics for Power Cables– An Overview", *IEEE Electrical Insulation Magazine,* Jan./Feb. 2001, 17(1), 14–22.

Marsden, H. et al., "Cable Diagnostics Business Technology Evaluation", *ABB ETI Technical Report, # BDC–R–01002,* Jan. 2001, 1–66.

Morrison, W.G., "Using New Technology to Improve Reliability of an Industrial Cable Distribution System", *IEEE Trans. On Industry Applications,* Mar./Apr. 1992, 28(2), 275–281.

Pultrum, E. et al., "Dutch Distribution Cable Performance", *IEEE Colloquium on "MV Paper Cables: Asset or Liability"?* Capenhurst, Apr. 21, 1998, 3/1 thru 3/6.

Brown, R.E., "Probabilistic Reliability and Risk Assessment of Electric Power Distribution Systems", *DistribuTECH Conference,* San Diego, Ca, Feb. 2001.

Brown, R.E., "Modeling the Impact of Substations on Distribution Reliability", *IEEE Transactions on Power Systems,* Feb. 1999, 14(1), 349–354.

Carvalho, A. et al., "Functional Specification as Driver for Technical/Economical Optimisation of Substation", *Presentation at CIGRE Session,* Paris, France, 2000, 1–10.

Beshir, M.J. et al., "Comparison of Monte Carlo Simulation and State Enumeration Based Adequacy Assessment Programs: CREAM and COMREL", *IEEE,* 1996, 438–444.

Van Casteren, J.F.L. et al., "Reliability Assessment in Electrical Power Systems: The Weibull–Markov Stochastic Model", *IEEE Transactions on Industry Applications,* May/Jun. 2000, 36(3), 911–915.

Lang, B.P. et al., "Power Distribution System Reliability Planning Using a Fuzzy Knowledge–Based Approach", *IEEE Transactions on Power Delivery,* Jan. 2000, 279–284.

Volkmann, C.A. et al., "A Probabilistic Approach to Distribution System Reliability Assessment", *Third International Conference on Probabilistic Methods Applied to Electric Power Systems,* Jul. 3–5, 1991, 169–173.

\* cited by examiner

VALUE-BASED TRANSMISSION ASSET MAINTENANCE MANAGEMENT OF ELECTRIC POWER NETWORKS

CROSS-REFERENCE TO RELATED APPLICATIONS

This application claims priority of U.S. Provisional Application Ser. No. 60/436,248 entitled "A Method For Implementing Value-Based Transmission Asset Maintenance Management Of Electric Networks," filed Dec. 23, 2002. This application is related to co-pending U.S. patent application Ser. No. 10/745,122, filed concurrently on Dec. 23, 2003, entitled "Failure Rate Adjustment For Electric Power Network Reliability Analysis", which is hereby incorporated by reference in its entirety.

FIELD OF THE INVENTION

The invention relates generally to transmission asset maintenance management of electric power networks and more particularly to a system and method for implementing value-based transmission asset maintenance management of electric power networks.

BACKGROUND OF THE INVENTION

Typical electric power networks include components such as circuit breakers, disconnectors, grounding switches, tie breakers, power transformers, overhead lines, underground cables, and the like. The condition of a component may have a great effect on the reliability of the power network. For example, a component that has been well maintained is probably not as likely to cause a power outage as compared to a component that has been completely neglected. Therefore, many electric utilities implement maintenance programs with the hope of improving asset utilization, enhancing power network reliability, and reducing overall operation and maintenance costs.

Electric utilities traditionally follow scheduled maintenance programs. For example, an electric utility may perform preventive maintenance in accordance with a manufacturer's recommended maintenance schedule. Such a technique, however, can lead to over-maintaining or under-maintaining a power network component or spending valuable resources on maintaining relatively unimportant components while not directing those resources to the critical power network components.

With the recent deregulation of power utilities and its resulting budget constraints, performing an appropriate amount of maintenance on the appropriate equipment is important for success in the market. Meanwhile, transmission reliability has become a major concern of establishing effective and efficient regional markets because of overdue grid development and aging bulk transmission facilities. This combination of shrinking budgets and aging power networks is making it more and more important to select the appropriate maintenance to perform.

Therefore, a need exists for a system and method for implementing value-based transmission asset maintenance management of electric power networks.

SUMMARY OF THE INVENTION

The invention is directed to a system and method for implementing value-based transmission asset maintenance management of electric power networks.

According to an aspect of the invention, a system and method is provided for value-based maintenance management of electric power networks. A method for assisting with maintenance management of a power network includes determining a set of power network components being likely to fail, determining a condition of each power network component, determining a reliability parameter corresponding to each power network component, determining an impact on the power network of a failure of each power network component, and determining, for each power network component, a risk value based on the impact on the power network of the power network component failure and determining a corresponding probability of power network component failure based on the reliability parameter and the condition of the power network component.

The method may further include prioritizing maintenance of the power network components based on the risk values for each power network component. The method may further include creating a maintenance management program based on the risk values for each power network component. The method may further include determining which of the power network components is critical based on the risk values for each of the power network components. The method may further include determining a set of maintenance options for each of the power network components, receiving a selection of a power component of the set of power network components likely to fail, receiving a selection of at least one of the set of maintenance options corresponding to the selected power network component, and determining a revised probability for the selected power network component based on the at least one selected maintenance option.

Determining the condition of each power network components may include comprises receiving the condition of a power network components from a data store containing information representative of the condition of particular power network components. Determining the reliability parameter may include receiving the reliability parameter from a data store containing information representative of the reliability of types of power network components. Determining the impact on the power network comprises determining the impact on the power network based on information representative of interconnectivity of the set of power network components.

The condition may include one of an external condition of each power network component, an internal condition of each power network component, an operational condition of each power network component, an environmental condition of each power network component, an age of each power network component, information representative of maintenance performed on each power network component, information representative of preventative maintenance performed on each power network component. The reliability parameter may include one of a failure rate of a type of power network component and an outage duration of a type of power network component. The impact on the power network may include one of a resource to repair the power network component, a reliability penalty corresponding to the power network component, a power network reconfiguration corresponding to the power network component, a power network redispatch corresponding to the power network component, a power network load shedding corresponding to the power network component, a power network switching corresponding to the power network component. The risk value may include a monetary value.

Determining the reliability parameter may include determining the reliability parameter by performing data mining on data representative of failures of a plurality of power network components of the same type as the power network component. Determining the reliability parameter comprises determining the reliability parameter by processing historical power network component failure data for a plurality of power network components of the same type as the power network component.

A system for assisting with maintenance management of a power network includes a first data store comprising power network component information and a computing application cooperating with the first data store and performing: determining a set of power network components being likely to fail, determining a condition of each power network component, determining a reliability parameter corresponding to each power network component, determining an impact on the power network of a failure of each power network component, and determining, for each power network component, a risk value based on the impact on the power network of the power network component failure and determining a corresponding probability of power network component failure based on the reliability parameter and the condition of the power network component.

The processor may further perform prioritizing maintenance of the power network components based on the risk values for each power network component. The processor may further perform creating a maintenance management program based on the risk values for each power network component. The processor may further perform determining which of the power network components is critical based on the risk values for each of the power network components. The processor may further perform: determining a set of maintenance options for each of the power network components, receiving a selection of a power component of the set of power network components likely to fail, receiving a selection of at least one of the set of maintenance options corresponding to the selected power network component, and determining a revised probability for the selected power network component based on the at least one selected maintenance option.

The first data store may contain information representative of the condition of particular power network components and determining the condition of each power network components may include receiving the condition of a power network components from the first data store. The first data store may contain information representative of the reliability of types of power network components and determining the reliability parameter may include receiving the reliability parameter from the first data store.

A method for developing a maintenance management program includes determining an assessment of a condition of a power network component and determining a set of maintenance options for the power network component, determining an analysis of power network component reliability performance and applying a model to define a set of credible power network outage events including contingency probability and system switching operations, developing a system impact assessment and risk quantification based on the condition assessment and the performance analysis, and creating the maintenance management program based on the system impact assessment and the risk quantification.

These and other features will be more fully set forth hereinafter.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the several views of the drawings, and wherein.

DETAILED DESCRIPTION OF ILLUSTRATIVE EMBODIMENTS

Exemplary Power Network

Figure 1:
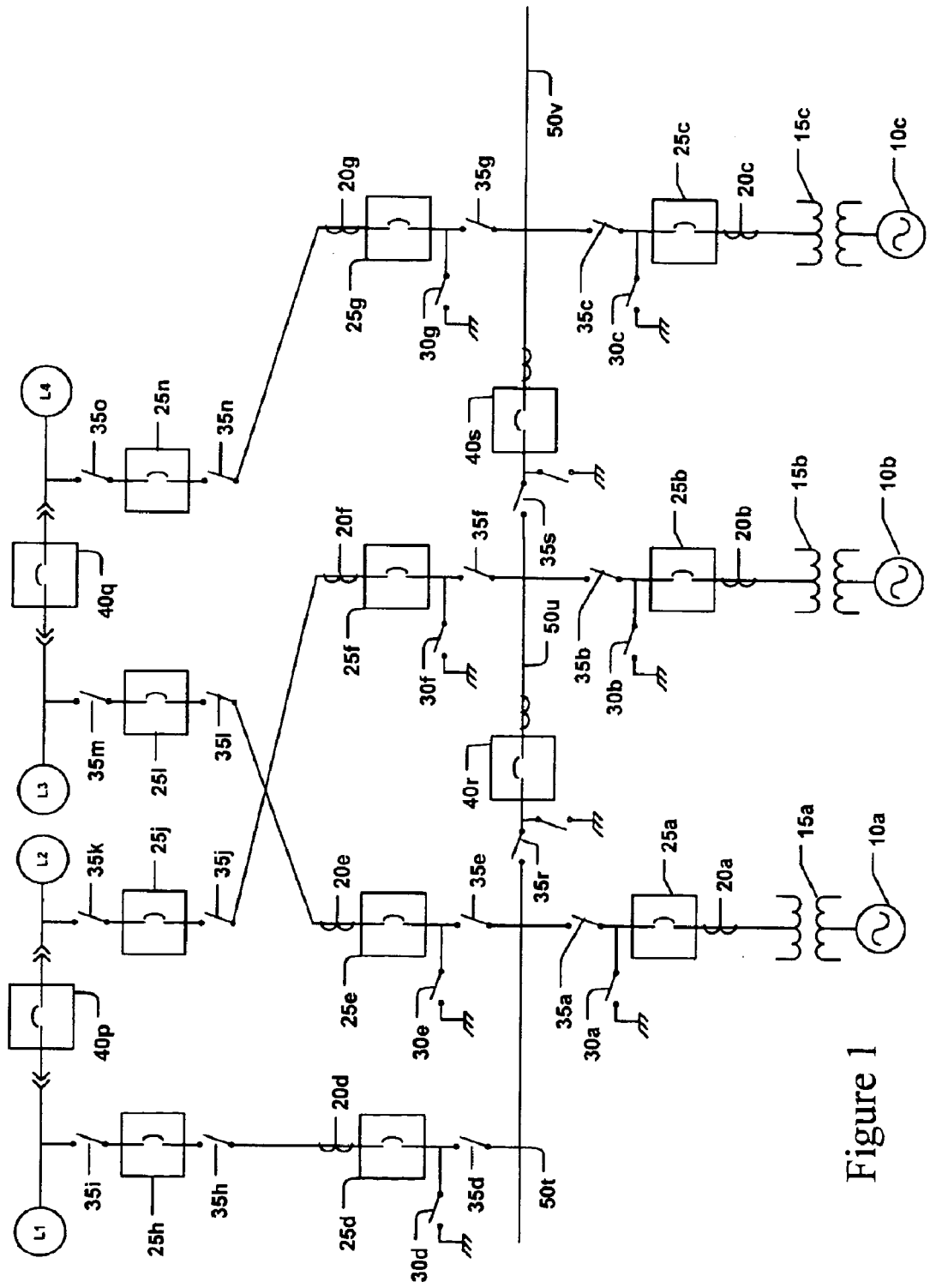
FIG. 1 is a graphical representation of an exemplary power network having power network components for which value-based maintenance management may be implemented in accordance with an embodiment of the invention.

FIG. 1 illustrates an exemplary power network having power network components, each of which may include subcomponents. The term power network is defined herein as a system having components for transmission and/or distribution of electrical power and includes any portion of the entire power network. For example, the power network may include an entire power transmission and distribution system, a subset of the entire power transmission and distribution system, a substation, a plurality of substations, a section of a transmission line, a section of a distribution line, and the like. As shown in FIG. 1, generators 10a–c are electrically connected to transformers 15a–c, respectively. Transformers 15a–c are electrically connected to circuit breakers 25a–c, respectively, and current transformers (CTs) 20a–c sense current from transformers 15a–c, respectively. Circuit breakers 25a–c are electrically connected to disconnectors 35a–c, respectively, which are in turn electrically connected to bus bar 50t–v, respectively. Grounding switches 30a–c are electrically connected to circuit breakers 25a–c respectively.

Bus bars 50t–v are electrically connected via tie breakers 40r–s, as shown. From bus bars 50, power is distributed to loads L1–L4, again through various circuit breakers 25 and disconnectors 35. Tie breaker 40p may connect loads L1 and L2, and tie breaker 40q may connect loads L3 and L4.

Tie breakers are normally open, but may be closed when reconfiguring a power network in response to a fault or maintenance. Reconfiguration of a power network attempts to power as many loads as possible, given a fault or maintenance on the power network. Faults are handled on a power network follows. If a fault occurs on circuit breaker 25f, power is interrupted with breakers 25b, 25j, 40r, and 40s, then disconnectors 35j and 35f are opened before repair is performed on circuit breaker 25f. Also, the power network may be reconfigured to supply as many loads as possible during component repair. For example, tie breaker 40p may be closed to provide power to load L2 via circuit breaker 25h, while circuit breaker 25f is being repaired. Some power networks have integrated components (not shown) which include the functionality of several components. Such integrated components provide advantages; however, the integrated components are handled differently than a corresponding group of individual components during a fault or during maintenance. For example, the number of breakers to be opened to repair a fault may be different for an integrated component. Similarly, isolation and reconfiguration for maintenance of an integrated component may be different than for a power network having only individual components.

Figure 2:
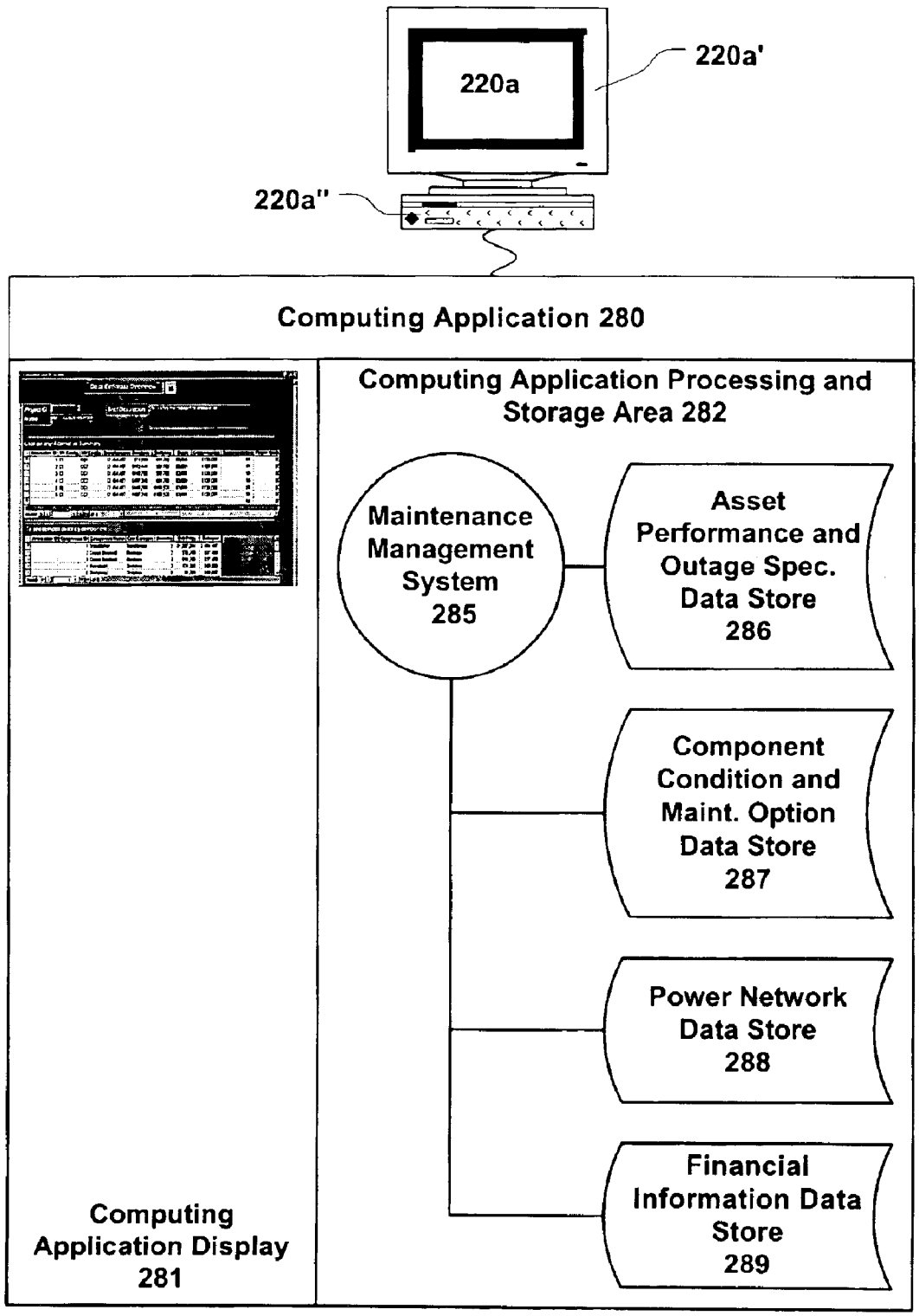
FIG. 2 is a diagram of an illustrative computing environment and an illustrative system for value-based maintenance management of a power network in accordance with an embodiment of the invention.

Power networks are typically operated within some specified or predefined constraints. For example, a high-voltage transmission line may have a maximum voltage and a maximum current specified, a power generator may have a maximum power output specified, a switch may have a maximum voltage and current specified, load shedding may occur in a specified order, and the like. These constraints may affect the way an electric utility operates the power network. Further, each operating condition may have associated financial costs (e.g., equipment damage costs, system re-dispatch costs, load shedding costs, and the like) and certain operating conditions may cause financial penalties to the electric utility. These financial implications may also affect the way an electric utility operates the power network.
Illustrative Computing Environment and System FIG. 2 shows computing system 220 that includes computer 220a. Computer 220a includes display device 220a' and interface and processing unit 220a". Computer 220a executes computing application 280. As shown, computing application 280 includes a computing application processing and storage area 282 and a computing application display 281. Computing application processing and storage area 282 may include maintenance management system 285, asset performance and outage specification data store 286, component condition and maintenance option data store 287, power network data store 288, and financial information data store 289. Maintenance management system 285 may implement systems and methods for value-based power network maintenance management. Computing application display 281 may include display content which may be used for value-based power network maintenance management. In operation, a user (not shown) may interface with computing application 280 through computer 220a. The user may navigate through computing application 280 to input, display, and generate data and information for value-based power network maintenance management.

Computing application 280 may generate value-based maintenance parameters, such as, for example, a dollar amount representative of the total impact to the power network for a particular power component failure, a predicted probability of a particular power network failure, and the like. The value-based maintenance parameters may be displayed to the user as display content via computing application display 281.

Figure 3:
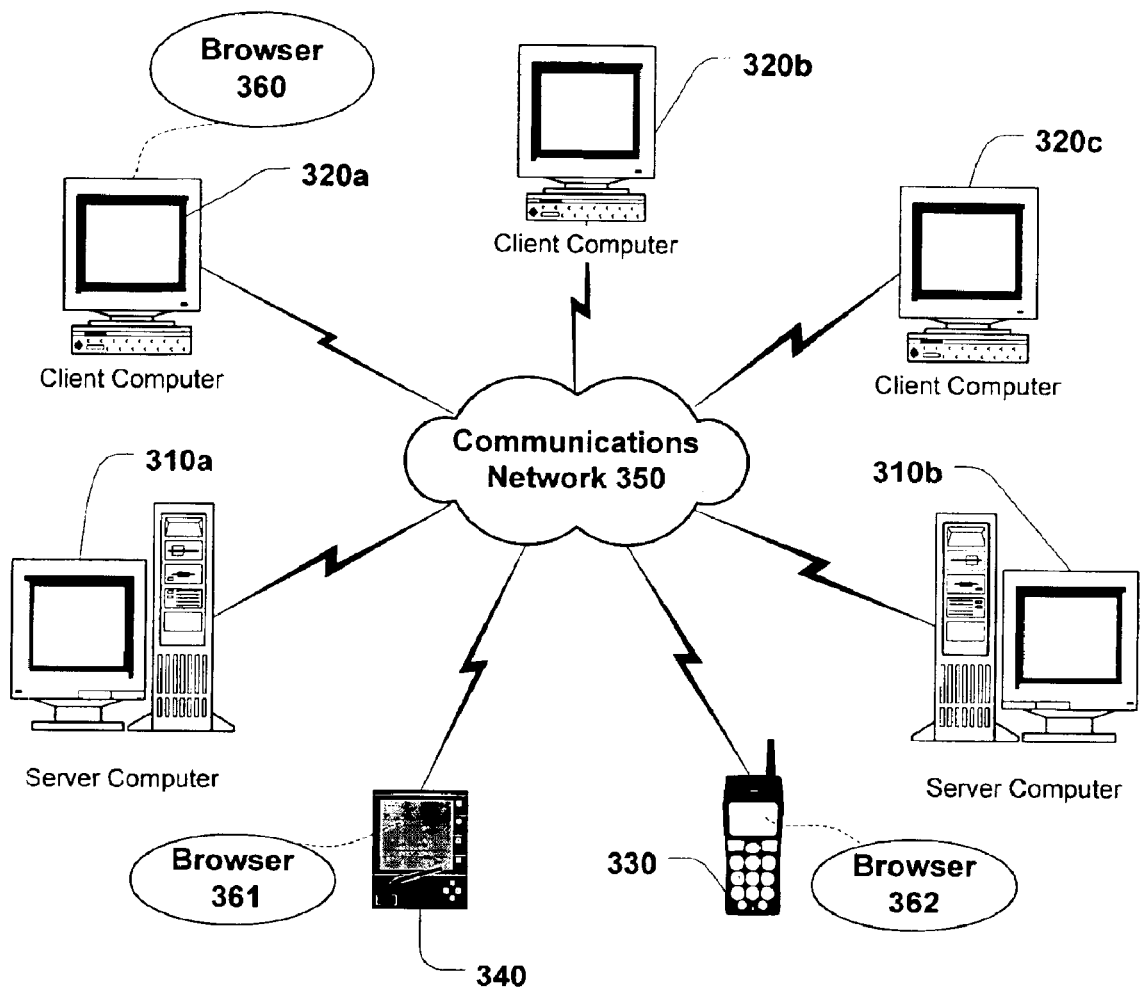
FIG. 3 is a diagram of an illustrative networked computing environment with which the illustrative system for value-based maintenance management of a power network may be employed in accordance with an embodiment of the invention.

Computer 220a, described above, can be deployed as part of a computer network. In general, the description for computers may apply to both server computers and client computers deployed in a network environment. FIG. 3 illustrates an exemplary network environment having server computers in communication with client computers, in which systems and methods for value-based maintenance management may be implemented. As shown in FIG. 3, a number of server computers 310a, 310b, etc., are interconnected via a communications network 350 with a number of client computers 320a, 320b, 320c, etc., or other computing devices, such as, a mobile phone 330, and a personal digital assistant 340. Communication network 350 may be a wireless network, a fixed-wire network, a local area network (LAN), a wide area network (WAN), an intranet, an extranet, the Internet, or the like. In a network environment in which the communications network 350 is the Internet, for example, server computers 310 can be Web servers with which client computers 320 communicate via any of a number of known communication protocols, such as, hypertext transfer protocol (HTTP), wireless application protocol (WAP), and the like. Each client computer 320 can be equipped with a browser 360 to communicate with server computers 310. Similarly, personal digital assistant 340 can be equipped with a browser 361 and mobile phone 330 can be equipped with a browser 362 to display and communicate data and information.

In operation, the user may interact with computing application 280 to perform value-based maintenance management and to generate value-based maintenance parameters, as described above. The generated value-based maintenance parameters may be stored on server computers 310, client computers 320, or other computing devices. The generated value-based maintenance parameters may be communicated to users via client computing devices, client computers 320, or the like.

Thus, systems and methods for value-based power network maintenance management can be implemented and used in a computer network environment having client computing devices for accessing and interacting with the network and a server computer for interacting with client computers. The systems and methods can be implemented with a variety of network-based and standalone architectures, and thus should not be limited those shown.
Data Stores Computing application processing and storage area 282 may include an asset performance and outage specification data store 286, component condition and maintenance option data store 287, power network data store 288, and financial information data store 289.

Asset performance and outage specification data store 286 may include information representative of the reliability (asset performance) of power network components, such as, for example, historical information on the failure rate of a particular type of circuit breaker, historical information on the failure rate of a particular type of power transformer, historical information on the failure rate of a particular type of overhead power line, average failure values for different types of components, and the like. Such information may be available from various electric utility organizations and particular illustrations of such information are described in more detail below. The information may be in the form of a reference database (e.g., a library of component failure rates, aggregated and decomposed, national/regional average and utility-specific statistics, and the like). The reliability information may include historical and real-time information.

Asset performance and outage specification data store 286 may also include a list of probable power network component failures, such as, for example, a failure of a particular section of power transmission line, a failure of a particular power transformer, a failure of a particular circuit breaker, and the like. The list of probable power network component failure may be determined from historical information, electric utility experience, the failure rates of various power network components, the conditions of various power network components, combinations thereof, and the like.

Component condition and maintenance option data store 287 may include information representative of the condition of a particular power network component, such as, for example, the age of a particular circuit breaker, the number of problems experienced with a particular circuit breaker, the number of months since the last preventive maintenance performed on a particular circuit breaker, and the like. The power component condition information may include intrinsic, external, operational, environmental, human error factors, and the like. Intrinsic factors may include factors such as age of equipment, manufacturing defects, size of conductors, and the like. External factors may include factors such as exposure to trees, birds/animals, wind, lightning, ice, and the like. Human error factors may include factors, such as vehicular accidents, accidents caused by utility or contractor work crew, vandalism, and the like. The condition information may come from equipment inspection, monitoring and diagnostics, expert experience, preventive maintenance information, and the like.

Component condition and maintenance option data store 287 may include information representative of different maintenance options that may be performed on particular type of power network component, such as, for example, an oil change of a power transformer, tree trimming near a power line, and the like. The various maintenance options may be classified as minor maintenance, major maintenance, an overhaul, and the like for each type of power network component.

Power network data store 288 may include information about the components of the power circuit, such as, for example, the location of power lines, the location of power poles, the location of power transformers and circuit breakers and protective devices, the type of circuit breakers, the location of power consumers, the interconnectivity of the power network components, the connectivity of the power network to consumers, the layout of the power network, and the like. The interconnectivity of the power network components may be modeled in a file using power network node numbers, in a computer-aided design (CAD) model, and the like.

Financial information data store 289 includes information representative of financial costs associated with the power network, such as, for example, the cost to repair a power network component, the cost to re-dispatch power network resources, the cost associated with load shedding, the cost associated with revenue loss, the cost associated with financial penalties for failure to provide power via the power network, the cost of maintaining a power network component, and the like.

Computing application processing and storage area 282 may include other data stores (not shown). For example, computing application processing and storage area 282 may include a data store that contains information representative of individual component maintenance times, maintenance frequencies, and the like, such as, for example, a maintenance frequency (MF), a mean time to maintain (MTTM), a mean time to repair (MTTR), a mean time to switch (MTTS) for switching components, and the like.

While computing application processing and storage area 282 is shown as including four databases, computing application processing and storage area 282 may include any number of databases. Further, the various data and information within computing application processing and storage area 282 may be distributed among various databases in any convenient fashion. Moreover, the data and information in computing application processing and storage area 282 may be stored in any convenient manner, such as, for example, in a multidimensional database, a relational database, tables, data structures, an analytical database, an operational database, a hybrid database, a text file, and the like.

Value-Based Maintenance Management

Figure 4:
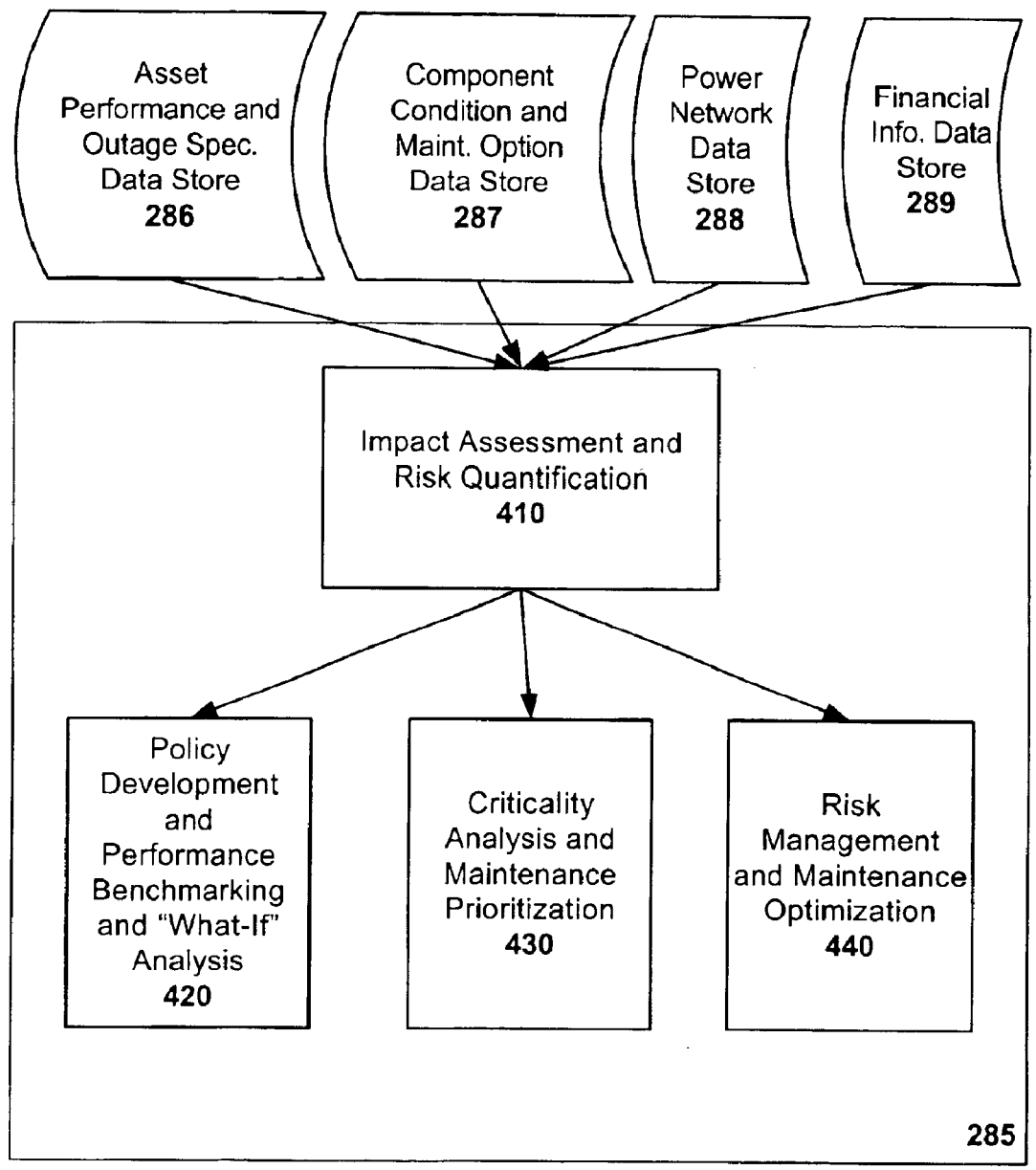
FIG. 4 is a diagram of an illustrative system for value-based maintenance management of a power network in accordance with an embodiment of the invention.

As shown in FIG. 4, maintenance management system 285 may include an impact assessment and risk quantification system 410, a policy development and performance benchmarking ("what-if" analysis) system 420, a criticality analysis and maintenance prioritization system 430, and a risk management and maintenance optimization system 440.

Maintenance management system 285 may determine a probability of a particular power network component failure based on the power network component condition. Maintenance management system 285 may also determine a corresponding cost associated with the impact of the component failure on the power network. In this manner, a user may view probable failures and their corresponding costs. The corresponding cost may be a total cost including the cost to repair the failed component, the cost to reconfigure the power network, financial penalties resulting from the failure, and the like. Maintenance management system 285 may also receive a selection of a maintenance option and determine a revised probability of power network component failure and a corresponding maintenance cost. In this manner, a user may view the effects of performing various maintenance options. Maintenance management system 285 may also identify and prioritize maintenance of critical power network components. Maintenance management system 285 may also schedule the maintenance of the critical power network components. In this manner, a user may become familiar with which power components are critical and may determine which maintenance options are effective. With such information, a user may develop a maintenance program based on the value of maintaining certain power network components. While the description of maintenance management system 285 may refer to the computing system of FIG. 2, maintenance management system 285 may be implemented on any appropriate computing system.

Impact assessment and risk quantification system 410 (or a separate engine, not shown) may determine a list of credible outage events associated with the failure of a power network components that may impact power network operation security and reliability. For example, impact assessment and risk quantification system 410 may perform statistical analysis of power network component performance including failure rates and outage durations and may apply appropriate models and procedures to select the most likely outage events (e.g., the most likely failed components).

Impact assessment and risk quantification system 410 (or a separate engine, not shown) may determine the risk of a power component failure based on a representative failure rate of power network components of the same or similar type. Impact assessment and risk quantification system 410 may determine the representative failure rate by receiving an average failure rate from asset performance and outage specification data store 286, by performing data mining on maintenance data, statistical analysis, by receiving such information from a user interface, and the like. Impact assessment and risk quantification system 410 may then adjust the failure rate based on the condition of the particular power network component. Impact assessment and risk quantification system 410 may determine the condition of the power network component by receiving information representative of the condition of the component from component condition and maintenance option data store 287. For example, impact assessment and risk quantification system 410 may determine that the probability of failure of transformers that are similar to transformer A is 0.1% and that the probability of a failure of transformer A is 0.11% (e.g., because of proximity to trees, etc). Further details of a technique for providing an adjusted failure rate based on power network component condition is given in co-pending U.S. patent application Ser. No. 10/745,122, entitled "Failure Rate Adjustment For Electric Power Network Reliability Analysis".

Impact assessment and risk quantification system 410 may determine the impact of a component failure to the power network and the risk of such failure. Impact assessment and risk quantification system 410 may determine the impact of the component failure on the power network (e.g., repair, switching, reconfiguration, re-dispatch). Impact assessment and risk quantification system 410 may use information from power network data store 288 to determine the impact to the power network. Impact assessment and risk quantification system 410 may then determine a risk value (e.g., a cost) based on the total impact to the power network. Impact assessment and risk quantification system 410 may use information from financial information data store 289 to determine the risk value. For example, impact assessment and risk quantification system 410 may determine that the total cost of the failure of transformer A is $10,000 based on the cost to repair to transformer A and based on financial penalties that will be accrued while transformer A is down. Typically, impact assessment and risk quantification system 410 determines the impact for a set of likely power component failures rather than for every possible failure (however, every possible failure could be analyzed). In this manner, impact assessment and risk quantification system 410 may determine, for each likely power component failure, a probability of failure and a total cost associated with the failure.

Policy development and performance benchmarking ("what-if" analysis) system 420 may determine revised risk values based on information received from a user via interface and processing unit 220a". The information may include a selection of a maintenance option to be performed on a power network component. What-if analysis system 420 may determine a revised failure rate based on the selected maintenance option. For example, what-if analysis system 420 may revise a failure rate to a slightly lower failure rate if the user selects to perform minor maintenance on the component. What-if analysis system 420 may revise a failure rate to a much lower failure rate if the user selects to perform major maintenance on the component. In this manner, a user may learn about the effect of performing various maintenance options on a power network component. For example, what-if analysis system 420 may determine that the probability of failure of transformer A is 0.1% if the trees are trimmed and is 0.09% if the trees are removed. The user may thus be able to perform benchmarking and develop a maintenance policy based on the what-if analysis. "What-if" analysis system 420 may be used in a first step in developing long-term maintenance strategy which includes using standard maintenance intervals and maintenance options for different types of facilities. System performance benchmarking cases may then be established to evaluate alternative maintenance policies, which may help an electric utility to justify a maintenance budget against system performance.

Criticality analysis and maintenance prioritization system 430 may determine a prioritized list of power network components based on the cost of the associated network component failure. Criticality analysis and maintenance prioritization system 430 may also determine the prioritized list based on the cost and the probability of component failure. That is, the cost may adjusted based on the probability of component failure. Criticality analysis and maintenance prioritization system 430 may be used as a second step in developing intermediate-term maintenance strategies such as region-wide criticality analysis to identify vital power network components (e.g., substations) that may cause significant system risk. This may help electric network utilities prioritize network-wide transmission and substation inspection tasks. Such criticality analysis may be used for condition-importance maintenance prioritization decisions.

Risk management and maintenance optimization system 440 may schedule maintenance of the power components. Risk management and maintenance optimization system 440 may be used as a third step in developing a maintenance program and may deal with both intermediate- and short-term maintenance strategies such as optimal maintenance resource allocation and task scheduling. This may include prioritizing identified maintenance based on achievable risk-reduction effectiveness from candidate preventive maintenance options and scheduling available maintenance resources based on risk-leveling criterion subject to technical and financial constraints. In this manner, a user may develop a list of preventive maintenance activities that are likely to provide a return in value, for example, in the form of increased power network reliability.

Figure 5:
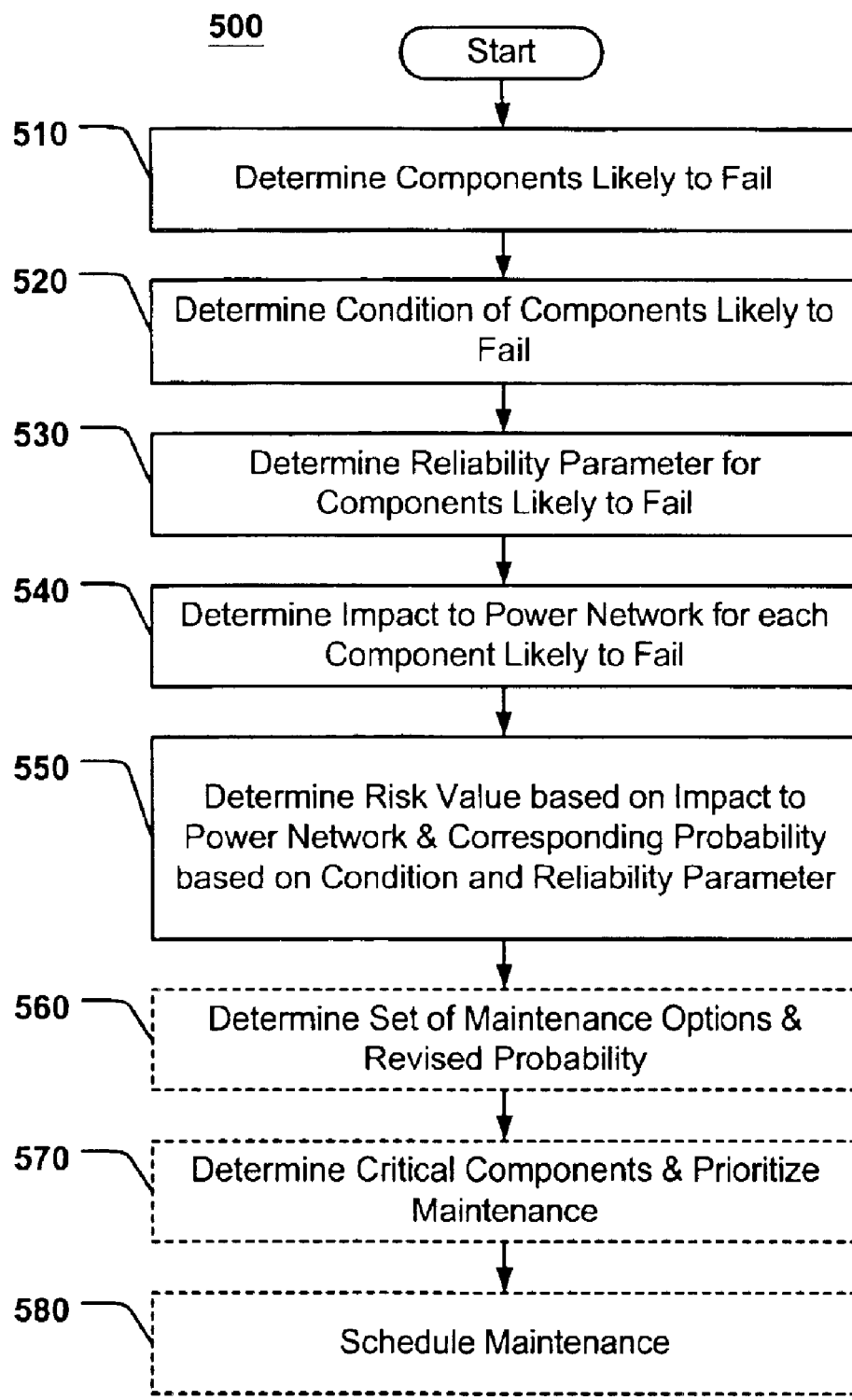
FIG. 5 is a flow diagram of an illustrative method for value-based maintenance management of a power network in accordance with an embodiment of the invention.

FIG. 5 shows an illustrative method for value-based maintenance management. While the following description may include references to the computing system of FIG. 2 and the maintenance management system of FIG. 4, method 500 may be implemented in a variety of ways, such as, for example, by a single computing engine, by multiple computing engines, via a standalone computing system, via a networked computing system, via a knowledge-based system, and the like.

As shown, at step 510 impact assessment and risk quantification system 410 determines a set of power network components that are likely to fail. Impact assessment and risk quantification system 410 may determine the set of components by receiving an indication of a set of components from asset performance and outage specification data store 286, by performing statistical analysis on historical data, by data mining, and the like.

At step 520, impact assessment and risk quantification system 410 determines a condition for each of the set of power network components that are likely to fail. The condition features may include the age of the power network component, the maintenance performed on the power network component, and the like and may be received from component condition and maintenance option data store 287.

At step 530, impact assessment and risk quantification system 410 determines a reliability parameter for each of the set of power network components that are likely to fail. Maintenance management system 285 may determine the reliability parameter by receiving an indication of a reliability parameter from asset performance and outage specification data store 286 (e.g., a failure rate, an outage duration, and the like), by performing statistical analysis on historical data, by data mining, and the like.

At step 540, impact assessment and risk quantification system 410 determines the impact to the power network for each component likely to fail.

At step 550, impact assessment and risk quantification system 410 determines a risk value (such as a dollar amount) based on the impact to the power network. Impact assessment and risk quantification system 410 also determines a probability of such an impact based on the reliability parameter and the component condition.

At optional step 560, policy development and performance benchmarking ("what-if" analysis) system 420 determines a selected maintenance option and determines a revised probability of failure based on the selected maintenance option.

At optional step 570, criticality analysis and maintenance prioritization system 430 determines a prioritization of power network components based on the risk value (e.g., by cost). Criticality analysis and maintenance prioritization system 430 may also determine the prioritization of power network components based on the risk value and the probability (e.g., by the cost times the probability of failure). Criticality analysis and maintenance prioritization system 430 may also determine the prioritization of power network components based on the risk value and the effectiveness of maintenance options.

At optional step 580, risk management and maintenance optimization system 440 determines a schedule for maintenance, which may be based on power network constraints, budget constraints, and the like.

Figure 6:
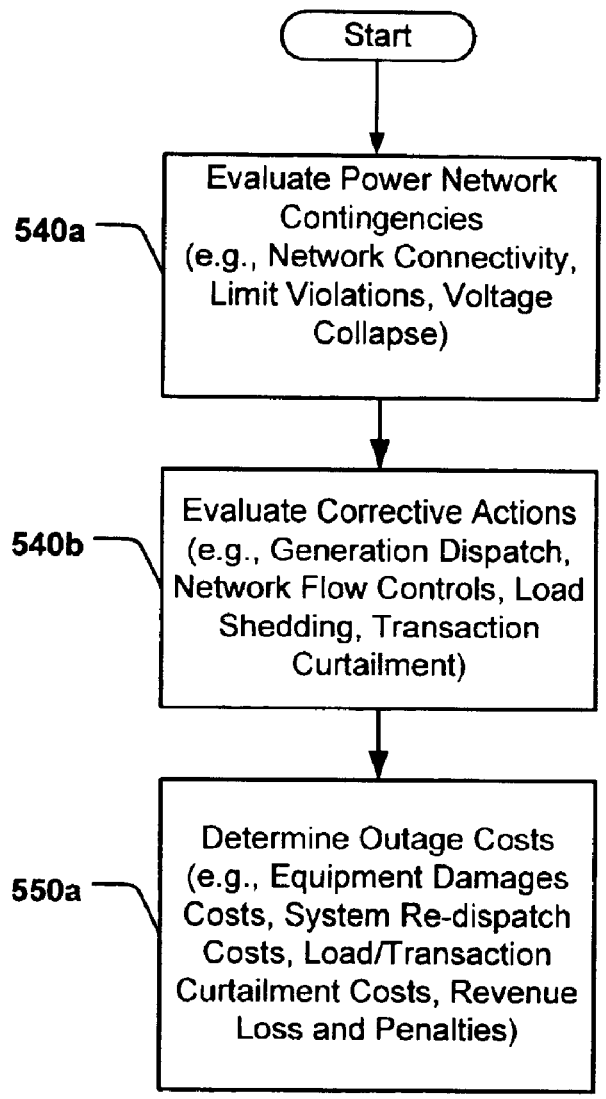
FIG. 6 is a flow diagram showing illustrative details of the method of FIG. 5 in accordance with an embodiment of the invention.

FIG. 6 shows more illustrative detail of steps 540 and 550. As shown in FIG. 6, at step 540*a*, impact assessment and risk quantification system 410 may determine for each component likely to fail, power network contingencies, such as, for example, the power network impact such as network connectivity, facility loading, voltage variation, voltage stability, and the like. Impact assessment and risk quantification system 410 may compare each contingency to a predefined constraint or limit. The power network contingencies may be evaluated using network flow based models. Such network power flow solution models and methods may determine post-contingency conditions and clarify voltage collapse problems.

Once power network constraint or limit violations are identified, appropriate corrective actions may be determined by impact assessment and risk quantification system 410 at step 540*b*. Corrective action may be determined to resume power network integrity and security. For example, for thermal overloading and voltage violation related problems, optimal power flow (OPF) models can be used to determine least-cost generation re-dispatch and network flow control solutions. Under severe contingency conditions, emergency load shedding and transaction curtailment may be implemented impact assessment and risk quantification system 410 may use interactive optimal real and reactive power flow solution methods to determine corrective actions to remove power network reliability criteria violations.

At step 550*a*, impact assessment and risk quantification system 410 determines the risk associated with power network operation (e.g., the financial consequences associated with equipment damage, system re-dispatch, emergency load shedding and transaction curtailment, loss of revenue, and the like). Impact assessment and risk quantification system 410 may use cumulative risk assessment methods to estimate the financial consequences of transmission outages under a range of projected power network operating scenarios.

Figure 7:
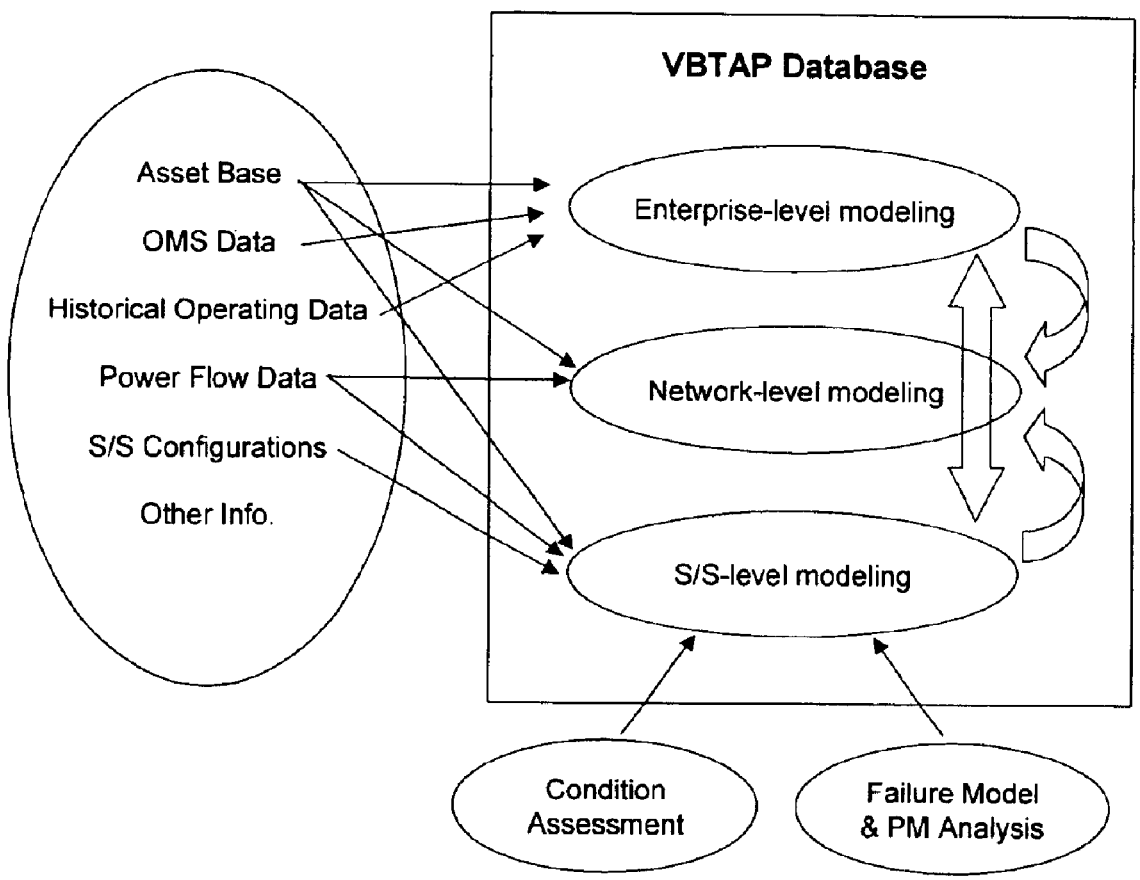
FIG. 7 is a diagram of an illustrative database structure for value-based maintenance management and transmission asset planning in accordance with an embodiment of the invention.

In more detail, FIG. 7 shows an illustrative database structure for value-based maintenance management and transmission asset planning. The database structure may facilitate transmission system modeling at different levels of detail. As shown, the three levels of transmission system modeling are enterprise-level modeling, network-level modeling, and substation-level modeling.

FIG. 7 also shows illustrative asset information sources that may be used for establishing a database and the relationships between these data sources and different levels of transmission power network modeling. The information in database may be correlated and integrated, allowing not only modeling of transmission networks in different levels of detail but also data sharing and exchange among different models and applications. For example, the reliability data of branch terminal in network-level modeling can be updated or customized when condition assessment or reliability analysis is performed on the corresponding substation.

Snapshots of power system conditions for a defined study period (e.g., a series of power flow cases created based on a given system peak case and load duration curve for that period) may be included in the database. The snapshots may assume a solved power flow case (system peak condition), adjust system load (scaling, both real and reactive power), adjust generation availability and output (scaling, UC and ED may be implemented), check AC power flow convergence, and the like. A trajectory of power system conditions for a defined study period (e.g., chronological hourly power flow cases created from market simulation results or system dispatching records) and may assume chronological hourly DC power flow cases, adjust system load (scaling reactive power only), allocate necessary generation-related voltage support resources, check AC power flow convergence, and the like.

Contingency evaluation and corrective actions may be determined via a power flow analysis engine. A network reliability assessment engine may be used for risk assessment. That is, the engine may simulate the impacts of contingencies on the power network with respect to line or equipment overloading and voltage violations. The Newton-Raphson (NR) iterative method may be employed to solve the non-linear power flow equations. Essentially, in NR power flow equations are linearized around an operating point using the first term of the Taylor series expansion of the net active injection on each bus of the power network. The linearized equations may be expressed in polar form. Sparsity techniques may be employed for storage and factorization of the Jacobian matrix.

The modeling of tap changer be expanded to account for voltage regulation of both the tapped-side and the untapped-side bus of the regulating transformer. Phase shifter modeling may be enabled to control real power flow across phase shifters by augmenting the Jacobian matrix one row for each regulating phase shifter. The real power flow mismatch becomes a function of the phase shifter angle as well as the mismatch of the complex voltages in the system.

On-load tap changing or fixed-tapped transformers may be modeled with phase shift on top of their off-nominal voltage tap ratio. The capability to support transformer complex turns ratio capability may be implemented. Generator Q limits may be read explicitly instead of being calculating them from KVA rating of generators. For multiple generators controlling voltage of the same bus, proportionate allocation of Q generation may be implemented based on a user input Q allocation parameter.

Slack bus angles may be externally specified to enable a solution of multi-island systems in case of line outage contingency, for example. DC lines may be automatically converted into equivalent active injections at both the HVDC converter and inverter transformer busses. Key convergence parameters in Newton-Raphson may be reported. For example, the maximum mismatches in bus real power, reactive power, voltage magnitude, and voltage angle and their bus location may be reported per iteration. Upon convergence, slack bus generation and largest MVA mismatches may also be reported. Further, the user may check line/transformer thermal overloading and voltage limit violation on a solved case.

Contingency analysis may perform a circuit connectivity check to ensure that the power network is connected before performing Newton Raphson. If the power network has islands, all buses not connected to the swing bus tree are reported. For difficult cases, two rescue algorithms are implemented before concluding divergence. The first attempt is to scale down the voltage correction after a Newton-Raphson iteration, that is, the scalar α in the voltage update equation below is successively scaled down until convergence is achieved.

$$V_{k+1} = V_k + \alpha \Delta V_k, \quad \alpha < 1$$

If the voltage correction attempt is unsuccessful, then the line impedance scaling approach is taken. This technique involves successive scaling up of the impedance of the line in the contingency, that is, the scalar β in the equation below is successively scaled up until convergence is achieved.

$$Z_{p+1} = Z_p + \beta \Delta Z_p, \quad \beta > 1$$

Figure 8:
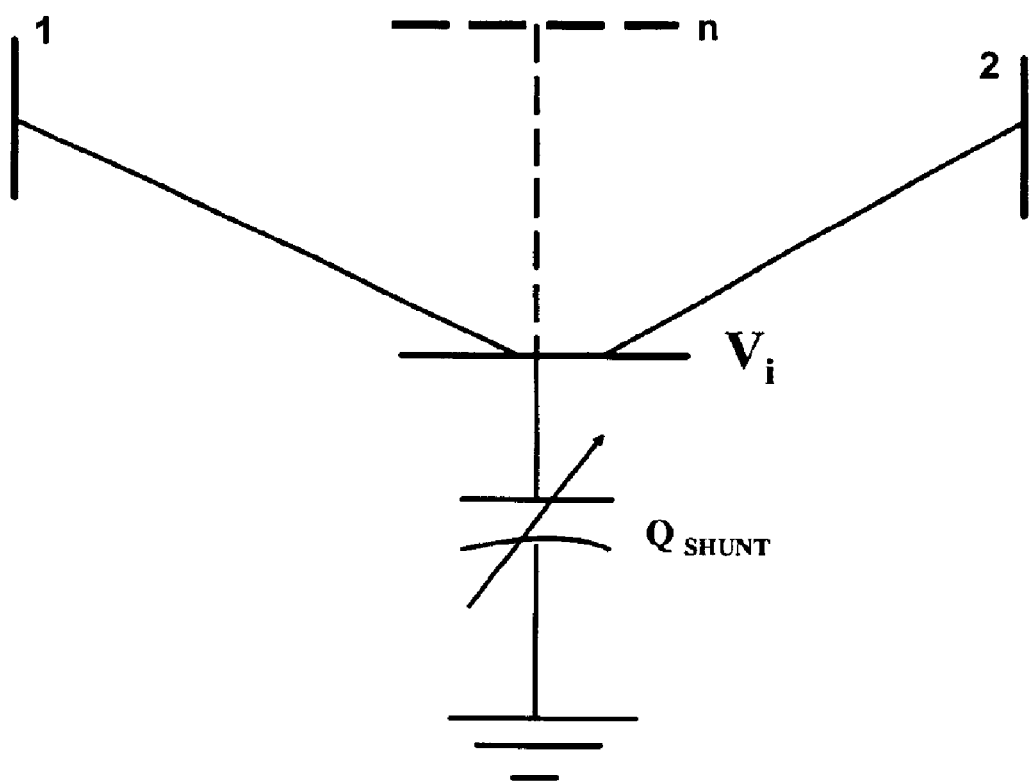
FIG. 8 is a diagram of an exemplary switched shunt regulated bus for use in deriving switched shunt control equations for power flow analysis for value-based maintenance management in accordance with an embodiment of the invention.

A switched shunt bank may contain either reactors or capacitor elements or a combination of both. The elements or blocks are switched on individually to maintain the voltage at a regulated bus to within a certain band. Switching is initiated when the current voltage solution falls outside the band. To determine the amount of switching and hence reactive compensation the voltage error is converted to equivalent Q compensation. Given a switched shunt regulated bus shown in FIG. 8, the compensation can be estimated by linearization. Thus, given the equation for complex power injection at a switched shunt regulated bus, $$P_i + jQ_i = V_i I_i^* = V_i (Y_{ii} V_1 + Y_{i1} V_1 + \ldots Y_{in} V_n)^*$$

and that, $$Q_i = IMAG\{V_i(Y_{ii} V_1 + Y_{i1} V_1 + \ldots Y_{in} V_n)^*\},$$

the incremental change in Qi as a function of change in voltage Vi is:

$$\Delta Q_1 = \Delta\{IMAG(Y_{ii}|V_i|^2)\}.$$

Simplifying results in, $$\Delta Q_i = \Delta\{B_{ii}|V_i|^2\}.$$

Hence, the required compensation to correct a voltage error is:

$$\Delta(Q_{SHUNT})_i = 2B_{ii}|V_i| \cdot \Delta|V_i|$$

Figure 9:
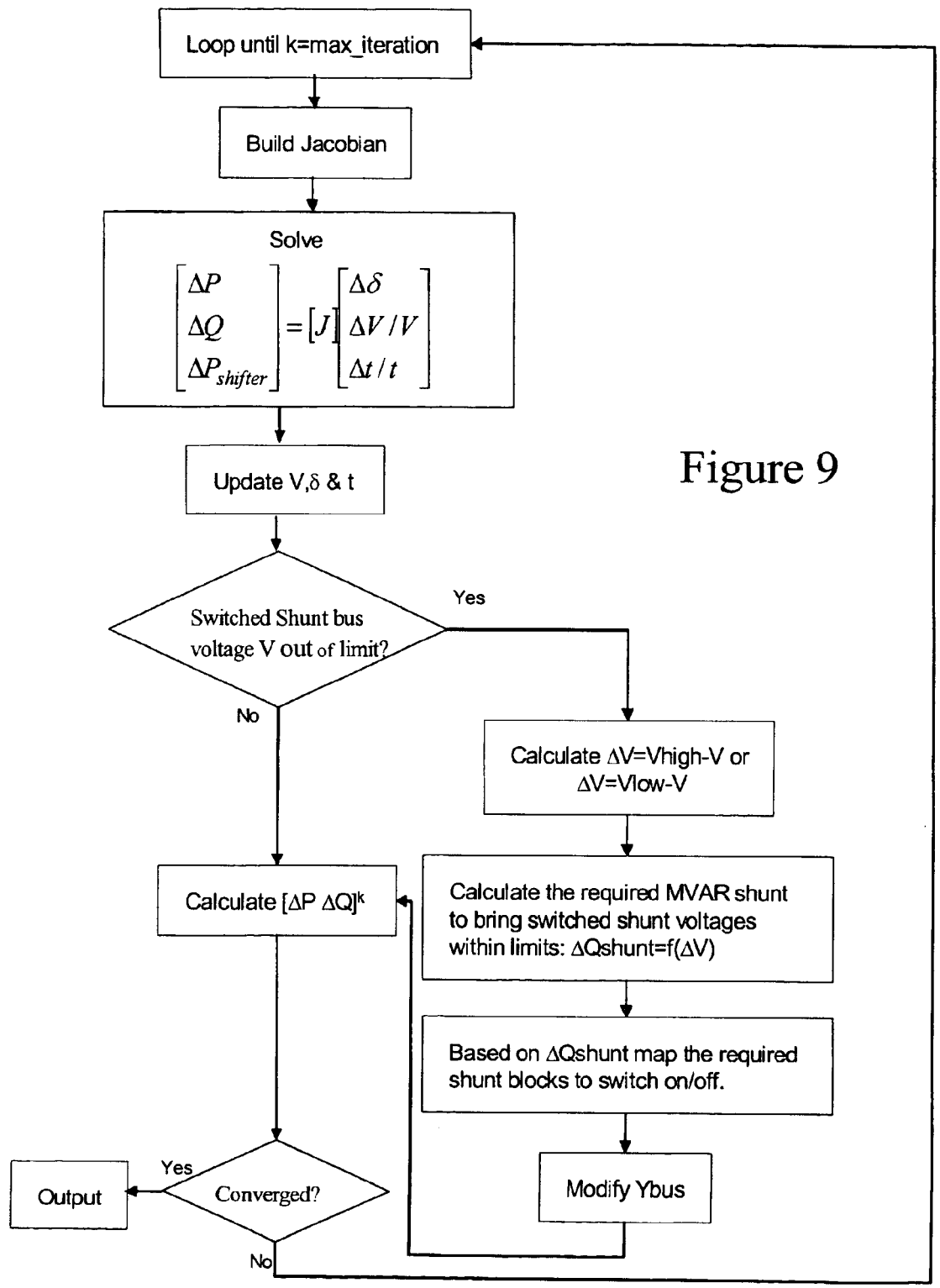
FIG. 9 is an illustrative flow diagram for performing power flow analysis with integration of switched shunt control in a Newton Raphson algorithm for value-based maintenance management in accordance with an embodiment of the invention.

FIG. 9 shows the integration of switched shunt control within the Newton Raphson method.

Figure 10:
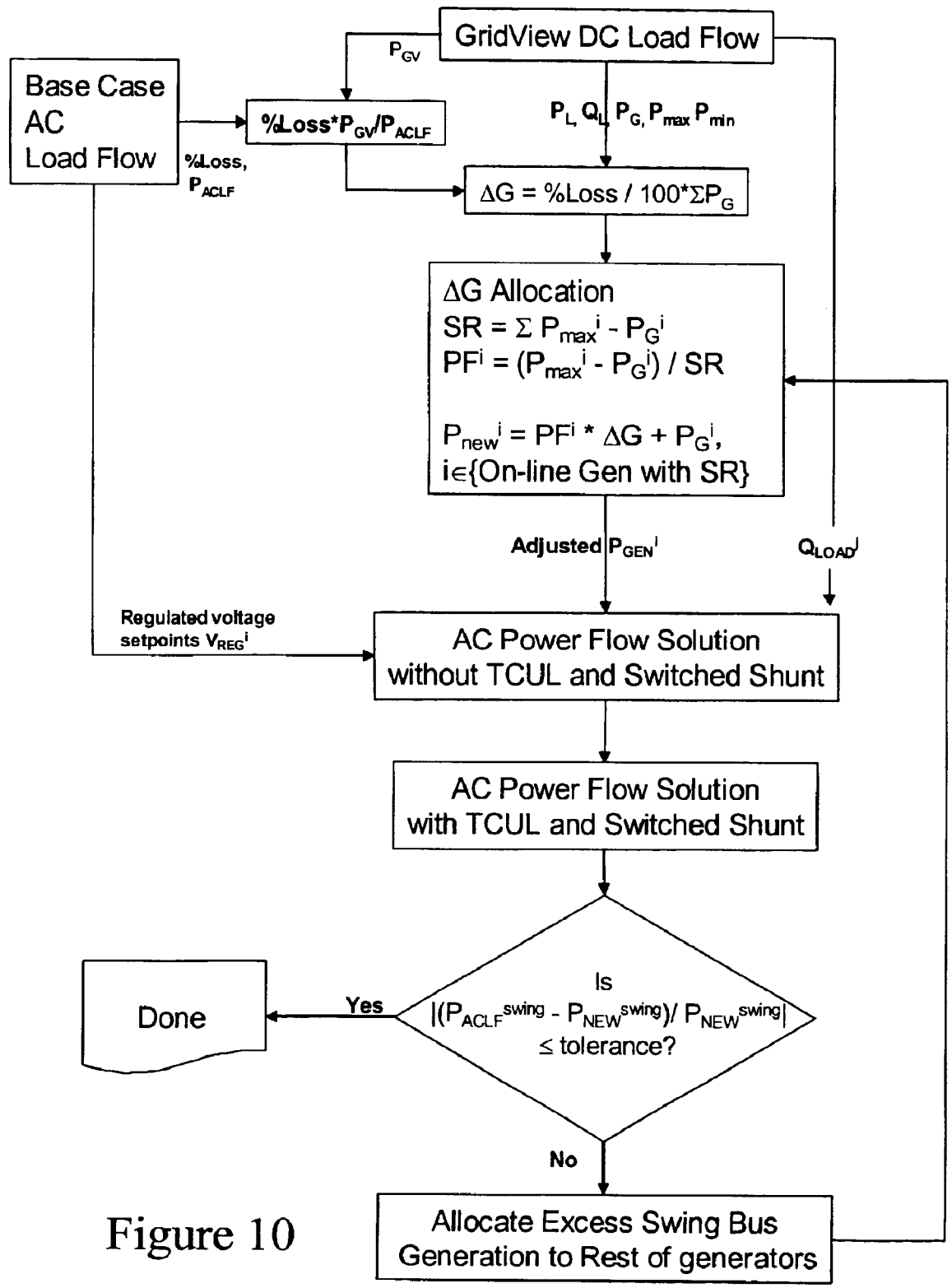
FIG. 10 is an illustrative flow diagram for converting DC power flow analysis to AC power flow analysis for value-based maintenance management in accordance with an embodiment of the invention.

An AC solution to a solved DC power flow case may be used to identify potential voltage problems. The first part of the process is to allocate the real power line losses to the on-line generators. From a DC solved case, an equivalent MW losses could be calculated given the system transmission losses in percent. Then, an AC power flow is initiated to solve the modified case. A check on the swing bus generation is performed if its generation is within its maximum and minimum limits. If it is outside limits, the excess or deficient generation will then be allocated to the rest of the generators. Then, another AC power flow is performed. This sequence is continued in a loop until the swing bus generation is within its generating limits. A flowchart describing this algorithm is shown in FIG. 10.

Figure 11:
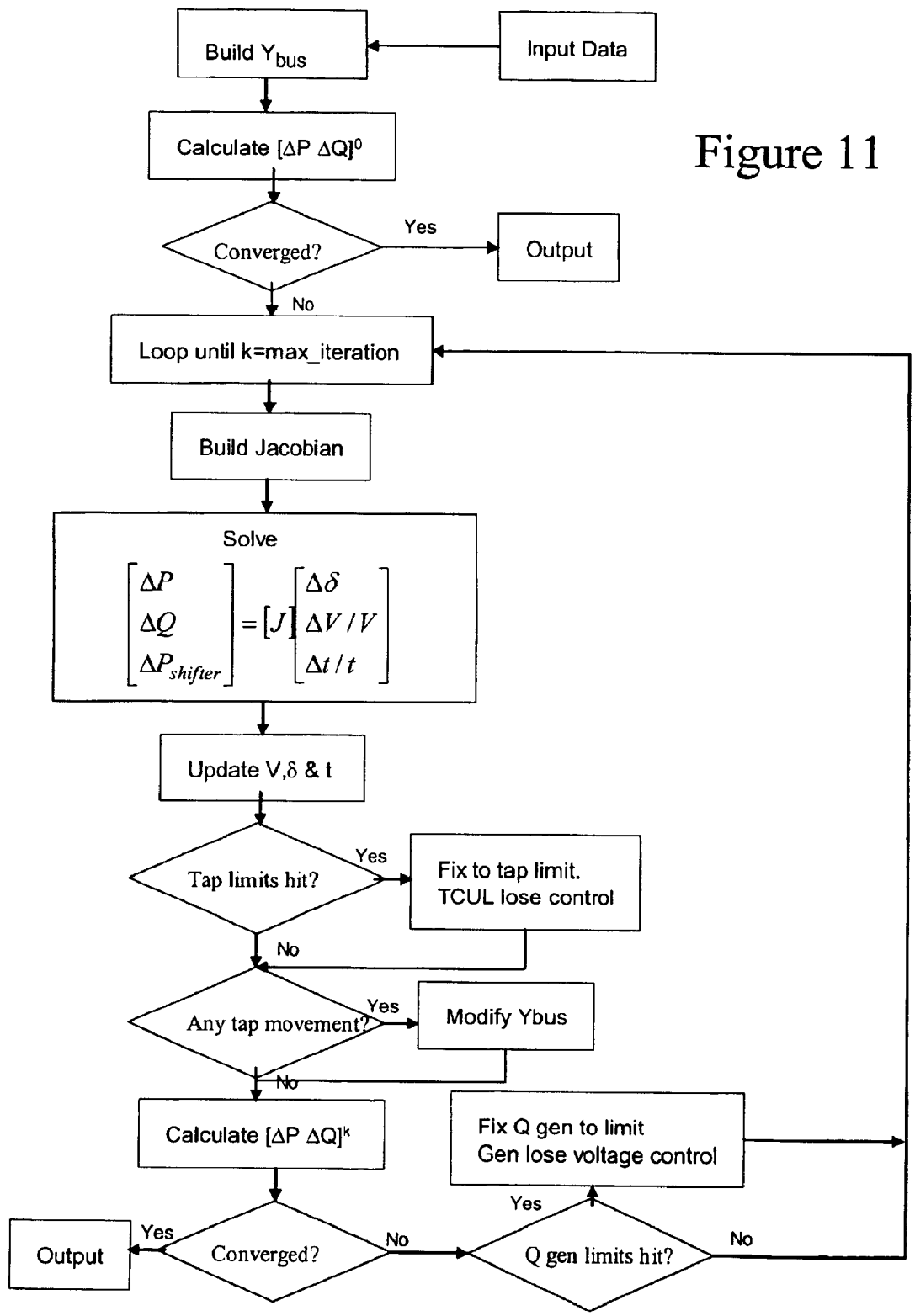
FIG. 11 is an illustrative flow diagram of a Newton-Raphson iterative method for power flow analysis for value-based maintenance management in accordance with an embodiment of the invention.

A flow chart of a Newton-Raphson iterative method is shown in FIG. 11. The Jacobian may be stored as a sparse matrix. Subsequent solutions of the linearized equations involving LU factorization may be implemented using sparsity oriented techniques. The Jacobian may be refreshed every iteration.

Illustrative power flow data structures are shown in Table 1. Each variable is described by its name (e.g., as a member of a class structure) in the second column, followed by a short description, default values, and type.

TABLE 1

| N | Name | Definition | Comments/ Default Value | Type |
|---|------|------------|-------------------------|------|
|   |      | Bus Data   |                         |      |
| 1 | Bus.ID | Unique number for the bus |  | I |
| 2 | Bus.Name | Unique name for the bus | Blank(8) | Char |
| 3 | Bus.BasekV | Bus kV base voltage | 0 | R |
| 4 | Bus.TypeCode | 1-Load bus 2-Generator bus 3-Swing bus 4-Isolated | 1 | I |
| 5 | Bus.Vmag | Bus voltage magnitude in pu | 1 | R |
| 6 | Bus.Vang | Bus voltage angle in degrees; | 0 | R |
| 7 | Bus.GL | Bus real shunt admittance to ground | 0 | R |
| 8 | Bus.BL | Bus reactive shunt admittance to ground | 0 | R |
| 9 | Bus.Area | Bus area number | 1 | I |
| 10 | Bus.Zone | Bus zone number | 1 | I |
|    |          | Line data |   |   |
| 1 | Line.FromBus | From connection bus of line |  | I |
| 2 | Line.ToBus | To connection bus of line |  | I |

TABLE 1-continued

| N | Name | Definition | Comments/Default Value | Type |
|---|---|---|---|---|
| 3 | Line.ID | Unique identifier for line | '1' | Char |
| 4 | Line.R | Line's resistance in pu | | R |
| 5 | Line.X | Line's reactance in pu | | R |
| 6 | Line.B | Line's charging susceptance in pu | 0 | R |
| 7 | Line.RateA | Line MVA rating-A | 0 | R |
| 8 | Line.RateB | Line MVA rating-B | 0 | R |
| 9 | Line.RateC | Line MVA rating-C | 0 | R |
| 12 | Line.LineLength | Line Length in miles | 0 | R |
| 13 | Line.Status | 1-In service, 0-Out of Service | 1 | R |

Transformer data

| N | Name | Definition | Comments/Default Value | Type |
|---|---|---|---|---|
| 1 | Trafo.FromBus | Tapped side transformer bus number | | I |
| 2 | Trafo.ToBus | Untapped side transformer bus number | | I |
| 3 | Trafo.ID | Unique transformer id | '1' | Char |
| 4 | Trafo.R | Transformer resistance in pu | | R |
| 5 | Trafo.X | Transformer reactance in pu | | R |
| 6 | Trafo.Ratio | Off Nominal Tap Ratio in pu | 1 | R |
| 7 | Trafo.TapIncrement | Discrete tap movement in pu | 0.00625 | R |
| 8 | Trafo.TapAngle | in degrees | 0 | R |
| 9 | Trafo.TapMax | Maximum tap setting in pu | 1.51 | R |
| 10 | Trafo.TapMin | Minimum tap setting in pu | 0.5 | R |
| 11 | Trafo.Icont | Regulated bus number. (+) if on untapped side, (−) if on the tapped side | 0 | I |
| 12 | Trafo.SetPoint | Set voltage in pu. (= 0) for unregulated Trafo. = input bus voltage magnitude for regulated bus | | R |
| 13 | Trafo.RateA | Transformer MVA rating-A | 0 | R |
| 14 | Trafo.RateB | Transformer MVA rating-B | 0 | R |
| 15 | Trafo.RateC | Transformer MVA rating-C | 0 | R |
| 16 | Trafo.Status | Transformer Status: 1-Online, 0-Offline | 1 | |
| 16 | Trafo.Vmin | Transformer regulated bus min volts | | R |
| 17 | Trafo.Vmax | Transformer regulated bus max volts | | R |
| 18 | Trafo.ICONT | Remote voltage controlled bus number | | I |

Source Data

| N | Name | Definition | Comments/Default Value | Type |
|---|---|---|---|---|
| 1 | Source.FromBus | Generator terminal bus number | | I |
| 2 | Source.Name | Machine # | '1' | I |
| 3 | Source.Vmag | Voltage magnitude set point | 1 | R |
| 4 | Source.Vang | Voltage angle reference (swing bus only) | 0 | R |
| 5 | Source.P | Real power generation in pu | 0 | R |
| 6 | Source.Q | Reactive power generation in pu | 0 | R |
| 7 | Source.Qmax | Maximum MVAR gen limit | 9999 | R |
| 8 | Source.Qmin | Minimum MVAR gen limit | −9999 | R |
| 9 | Source.MVA | MVA Rating | System MVA base | R |
| 10 | Source.Status | Status of Machine: 1-Online, 0-Offline | 1 | |
| 11 | Source.Rmpct | Percent of the total Mvar required to hold generator terminal bus voltage | 100 | R |
| 12 | Source.R | Resistance in pu | | R |
| 13 | Source.X | Reactance in pu | | R |
| 14 | Source.RT | Step-up transformer resistance in pu | | R |
| 15 | Source.XT | Step-up transformer reactance in pu | | R |
| 16 | Source.IREG | Remote voltage controlled bus number | | I |
| 17 | Source.Pmax | Maximum Real power generation | | R |
| 18 | Source.Pmin | Minimum Real power generation | | R |

Load Data

| N | Name | Definition | Comments/Default Value | Type |
|---|---|---|---|---|
| 1 | Load.FromBus | Bus Number where load is connected | | I |
| 2 | Load.ID | Load ID Number to differentiate among multiple loads in a single bus | '1' | Char |
| 3 | Load.P | Real power component of constant power load in pu | 0 | R |

TABLE 1-continued

| N | Name | Definition | Comments/Default Value | Type |
|---|---|---|---|---|
| 4 | Load.Q | Reactive power component of constant power load in pu | 0 | R |
| 5 | Load.IP | Real power component of constant current load in pu at one per unit voltage | 0 | R |
| 6 | Load.IQ | Reactive power component of constant current load in pu at one per unit voltage | 0 | R |
| 7 | Load.YP | Real power component of constant admittance load in pu at one per unit voltage | 0 | R |
| 8 | Load.YQ | Reactive power component of constant admittance load in pu at one per unit voltage | 0 | R |
| 9 | Load.Status | Load Status: 1-Online, 0-Offline | 1 | I |
| 10 | Load.Area | Area assignment of load | Area in which Load.FromBus is assigned | I |
| 11 | Load.Zone | Zone assignment of load | Zone in which Load.FromBus is assigned | I |
| *Switched Shunt Data* | | | | |
| 1 | Shunt.I | Bus ID where shunt is connected | | I |
| 2 | Shunt.Binit | Initial value of shunt admittance in MVAR at unity voltage | 0 | R |
| 3 | Shunt.Swrem | Bus number of remote bus to be controlled by this switched shunt | | I |
| 4 | Shunt.N(I) | I = 1 ... 8. Number of admittance steps for switched shunt block I | | R |
| 5 | Shunt.B(I) | I = 1 ... 8. Admittance value of each step of switched shunt block I | | R |
| *Two Terminal DC Transmission Line data* | | | | |
| 1 | HVDC.lineid | HVDC line data id | | I |
| 2 | HVDC.mdc | Control Mode: 0-blocked, 1-power, 2-current | Currently, in HVDC line modeling the HVDC line is converted to equivalent bus load or generation injection. | I |
| 3 | HVDC.setvl | Power or Current Demand | | I |
| 4 | HVDC.vsched | Scheduled compounded voltage schedule | | R |
| 5 | HVDC.rcomp | Compounding resistance | | R |
| *Simulation Data* | | | | |
| 1 | Simulation.MVABase | System MVA Base | 100 | R |
| 2 | Simulation.epsilon | Tolerance to test loadflow convergence | 0.0001 | R |
| 3 | Simulation.max_iter | Maximum allowable Newton Raphson iteration | 30 | I |
| 4 | Simulation.Vlow | Low voltage threshold | 0.93 | R |
| 5 | Simulation.Vhigh | High voltage threshold | 1.07 | R |
| 6 | Simulation.acc | Acceleration factor for voltage angle | 1.00 | R |
| 7 | Simulation.vcc | Acceleration factor for voltage magnitude | 1.00 | R |
| 8 | Simulation.Threshold | Line/Transformer Thermal Loading Percentage Threshold | 100% | R |
| 9 | Simulation.StudyType | 1-Power Flow, 4-Contingency Analysis | 1 | I |
| 10 | Simulation.Tapchoice | Flag for tap changer action: 0-LOCK, 1-UNLOCK | 0 | I |
| 11 | Simulation.Shiftchoice | Flag for phase shifter action: 0-LOCK, 1-UNLOCK | 0 | I |
| 12 | Simulation.qlimchoice | Flag for generator Q limit: 0-Ignore, 1-Apply immediately, k-apply at the kth iteration | 0 | I |

Overall Maintenance Management Program

Figure 12:
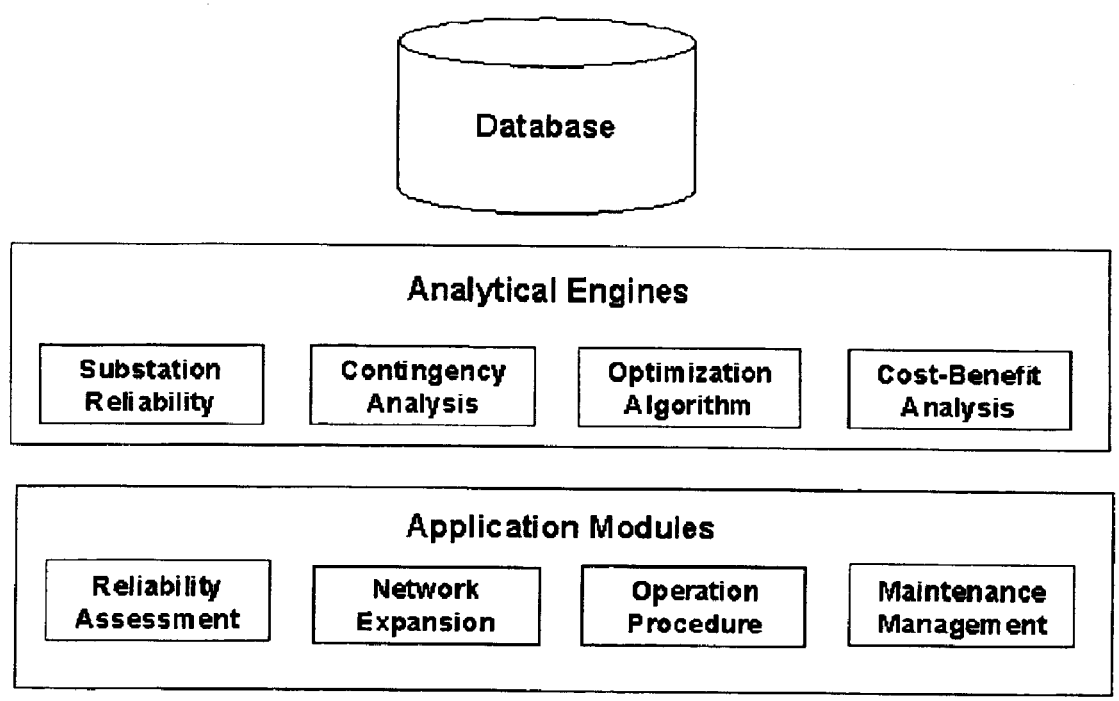
FIG. 12 is a block diagram of an illustrative overall value-based asset planning system including a value-based maintenance management system in accordance with an embodiment of the invention.

The value-based maintenance management system 285 may be a part of or may be integrated with an overall value-based asset planning system, such as shown in FIG. 12. Reliability is a measure of a power network's ability to transfer power from designated delivery points/areas to designated receipt points/areas without violation of system operating limit. This power delivery capability can be measured not only under normal system operating conditions but also under creditable contingency conditions. To more accurately measure the financial consequences of transmission system outages, the costs of equipment damage, generation re-dispatch, load shedding or interruption, transaction curtailment, and loss of revenue may be accurately evaluated.

Risk-based reliability criteria and assessment methods may be used to quantify the overall system risk due to unreliability. Risk may be measured as a product of contingency probability and system impact, where the system impact is quantified in terms of reliability criteria violations such as overload, low voltage and voltage instability and the associated cost consequences.

Figure 13:
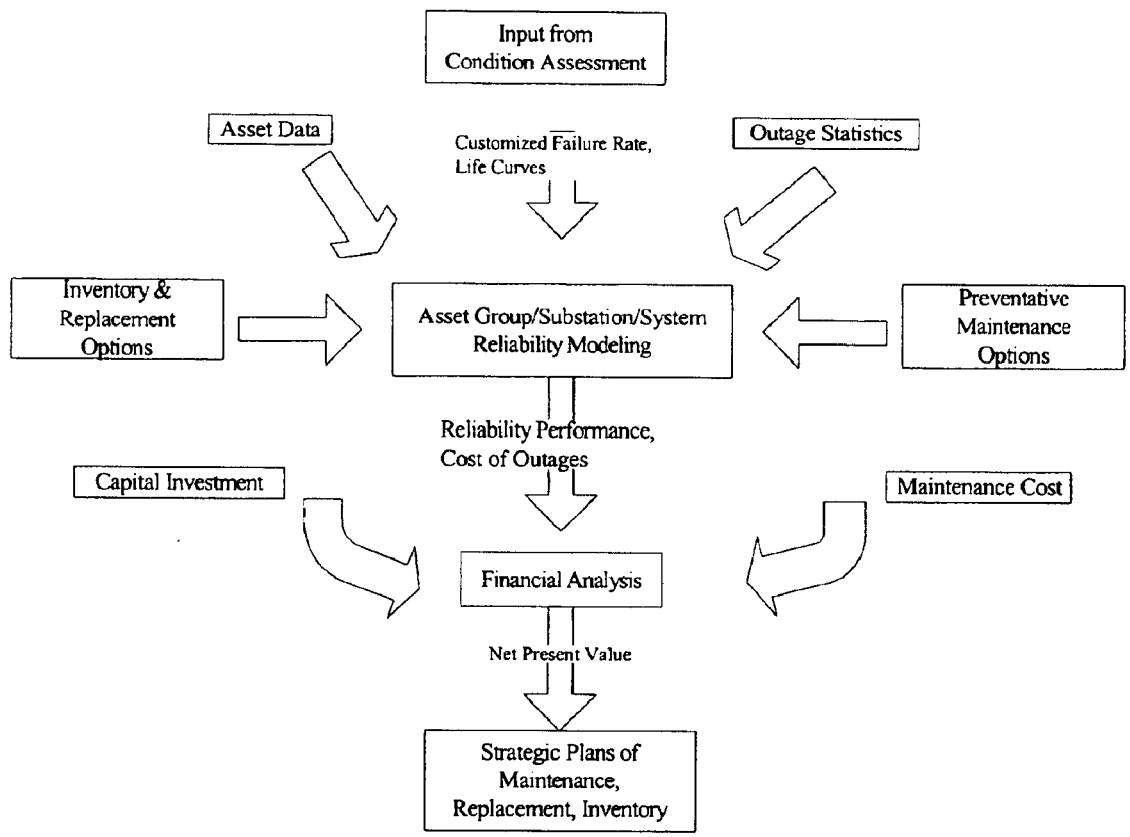
FIG. 13 is a block diagram of an illustrative strategic asset policy development tool which may be used to guide an overall asset maintenance planning process in accordance with an embodiment of the invention.

Optimization algorithms and cost-benefit analysis may be used to identify cost-effective system configurations and operation and maintenance (O&M) strategies and to balance capital investments and O&M expanses against various system reliability levels. FIG. 13 shows a diagram of strategic asset policy development tools, which may be used to guide the overall asset maintenance planning process and evaluate alternative inventory policies. Enhanced maintenance may be effective for achieving higher service availability and extending a network component's useful life beyond normal expectation. Strategic maintenance planning concerns long-term and intermediate-term optimal maintenance activity and interval schemes for bulk transmission equipment. The development tools may determine a predicted maintenance budget for maintaining an established reliability target given an overall system risk.

Conclusion

As can be seen, systems and methods for value-based maintenance management are disclosed that provide a user the ability to develop a maintenance program considering the probability of power network component failure and the corresponding cost of power network component failure.

The invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing examples have been provided merely for the purpose of explanation and are in no way to be construed as limiting of the invention. While the invention has been described with reference to illustrative embodiments, it is understood that the words which have been used herein are words of description and illustration, rather than words of limitations. Further, although the invention has been described herein with reference to particular structures, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed:

1. A method for assisting with maintenance management of a power network, the method comprising:
   determining a set of power network components being likely to fail;
   determining a condition of each power network component;
   determining a reliability parameter corresponding to each power network component;
   determining an impact on the power network of a failure of each power network component; and
   determining, for each power network component, a risk value based on the impact on the power network of the power network component failure and determining a corresponding probability of power network component failure based on the reliability parameter and the condition of the power network component.

2. The method as recited in claim 1, further comprising prioritizing maintenance of the power network components based on the risk values for each power network component.

3. The method as recited in claim 1, further comprising prioritizing maintenance of the power network components based on the risk values for each power network component and based on effectiveness of a plurality of maintenance options in reducing the risk values.

4. The method as recited in claim 1, further comprising creating a maintenance management program based on the risk values for each power network component.

5. The method as recited in claim 1, further comprising determining which of the power network components is critical based on the risk values for each of the power network components.

6. The method as recited in claim 1, further comprising:
   determining a set of maintenance options for each of the power network components;
   receiving a selection of a power component of the set of power network components likely to fail;
   receiving a selection of at least one of the set of maintenance options corresponding to the selected power network component; and
   determining a revised probability for the selected power network component based on the at least one selected maintenance option.

7. The method as recited in claim 1, wherein determining the condition of each power network components comprises receiving the condition of a power network components from a data store containing information representative of the condition of particular power network components.

8. The method as recited in claim 1, wherein determining the reliability parameter comprises receiving the reliability parameter from a data store containing information representative of the reliability of types of power network components.

9. The method as recited in claim 1, wherein determining the impact on the power network comprises determining the impact on the power network based on information representative of interconnectivity of the set of power network components.

10. The method as recited in claim 1, wherein the condition comprises one of an external condition of each power network component, an internal condition of each power network component, an operational condition of each power network component, an environmental condition of each power network component, an age of each power network component, information representative of maintenance performed on each power network component, information representative of preventative maintenance performed on each power network component.

11. The method as recited in claim 1, wherein the reliability parameter comprises one of a failure rate of a type of power network component and an outage duration of a type of power network component.

12. The method as recited in claim 1, wherein determining the reliability parameter comprises determining the reliability parameter by performing data mining on data representative of failures of a plurality of power network components of the same type as the power network component.

13. The method as recited in claim 1, wherein determining the reliability parameter comprises determining the reliability parameter by processing historical power network component failure data for a plurality of power network components of the same type as the power network component.

14. The method as recited in claim 1, wherein the impact on the power network comprises one of a resource to repair the power network component, a reliability penalty corresponding to the power network component, a power network reconfiguration corresponding to the power network component, a power network redispatch corresponding to the power network component, a power network load shedding corresponding to the power network component, a power network switching corresponding to the power network component.

15. The method as recited in claim 1, wherein the risk value comprises a monetary value.

16. A system for assisting with maintenance management of a power network, the system comprising:
    a first data store comprising power network component information;
    a computing application, the computing application cooperating with the first data store and performing:
        determining a set of power network components being likely to fail;
        determining a condition of each power network component;
        determining a reliability parameter corresponding to each power network component;
        determining an impact on the power network of a failure of each power network component; and
        determining, for each power network component, a risk value based on the impact on the power network of the power network component failure and determining a corresponding probability of power network component failure based on the reliability parameter and the condition of the power network component.

17. The system as recited in claim 16, wherein the processor further performs prioritizing maintenance of the power network components based on the risk values for each power network component.

18. The system as recited in claim 16, wherein the processor further performs prioritizing maintenance of the power network components based on the risk values for each power network component and based on effectiveness of a plurality of maintenance options in reducing the risk values.

19. The system as recited in claim 16, wherein the processor further performs creating a maintenance management program based on the risk values for each power network component.

20. The system as recited in claim 16, wherein the processor further performs determining which of the power network components is critical based on the risk values for each of the power network components.

21. The system as recited in claim 16, wherein the processor further performs:
    determining a set of maintenance options for each of the power network components;
    receiving a selection of a power component of the set of power network components likely to fail;
    receiving a selection of at least one of the set of maintenance options corresponding to the selected power network component; and
    determining a revised probability for the selected power network component based on the at least one selected maintenance option.

22. The system as recited in claim 16, wherein the first data store contains information representative of the condition of particular power network components and wherein determining the condition of each power network components comprises receiving the condition of a power network components from the first data store.

23. The system as recited in claim 16, wherein the first data store contains information representative of the reliability of types of power network components and wherein determining the reliability parameter comprises receiving the reliability parameter from the first data store.

24. The system as recited in claim 16, wherein determining the impact on the power network comprises determining the impact on the power network based on information representative of interconnectivity of the set of power network components.

25. The system as recited in claim 16, wherein the condition comprises one of an external condition of each power network component, an internal condition of each power network component, an operational condition of each power network component, an environmental condition of each power network component, an age of each power network component, information representative of maintenance performed on each power network component, information representative of preventative maintenance performed on each power network component.

26. The system as recited in claim 16, wherein the reliability parameter comprises one of a failure rate of a type of power network component and an outage duration of a type of power network component.

27. The system as recited in claim 16, wherein determining the reliability parameter comprises determining the reliability parameter by performing data mining on data representative of failures of a plurality of power network components of the same type as the power network component.

28. The system as recited in claim 16, wherein determining the reliability parameter comprises determining the reliability parameter by processing historical power network component failure data for a plurality of power network components of the same type as the power network component.

29. The system as recited in claim 16, wherein the impact on the power network comprises one of a resource to repair the power network component, a reliability penalty corresponding to the power network component, a power network reconfiguration corresponding to the power network component, a power network redispatch corresponding to the power network component, a power network load shedding corresponding to the power network component, a power network switching corresponding to the power network component.

30. The system as recited in claim 16, wherein the risk value comprises a monetary value.

31. A method for developing a maintenance management program, the method comprising:

determining an assessment of a condition of a power network component and determining a set of maintenance options for the power network component;

determining an analysis of power network component reliability performance and applying a model to define a set of credible power network outage events including contingency probability and system switching operations;

developing a system impact assessment and risk quantification based on the condition assessment and the performance analysis; and creating the maintenance management program based on the system impact assessment and the risk quantification.

* * * * *